United States Patent [19]

Goll et al.

[11] Patent Number: 4,849,728

[45] Date of Patent: Jul. 18, 1989

[54] INDUCTION GENERATOR

[75] Inventors: Manfred Goll, Glauburg; Erkenbert Wehner, Frankfurt am Main, both of Fed. Rep. of Germany

[73] Assignee: Alfred Eves, GmbH, Frankfurt am Main, Fed. Rep. of Germany

[21] Appl. No.: 131,170

[22] Filed: Dec. 10, 1987

[30] Foreign Application Priority Data

Dec. 15, 1986 [DE] Fed. Rep. of Germany ....... 3642770

[51] Int. Cl.$^4$ .................. H01F 27/02; H01F 27/28
[52] U.S. Cl. ........................................ 336/92; 29/606;
310/155; 336/100; 336/110; 336/192
[58] Field of Search .................. 310/155; 324/174;
335/260, 278; 336/96, 90, 92, 100, 110, 105,
192, DIG. 2; 29/606

[56] References Cited

U.S. PATENT DOCUMENTS

| | | | |
|---|---|---|---|
| 2,852,637 | 9/1958 | Pratt | 335/260 X |
| 3,252,024 | 5/1986 | Loudon | 310/155 |
| 3,290,635 | 6/1986 | Hofmann et al. | 336/100 |
| 3,757,263 | 9/1973 | Saarem et al. | 335/260 |
| 4,596,973 | 6/1986 | Form et al. | 310/155 |
| 4,652,818 | 3/1987 | Buchschmid et al. | 324/174 |
| 4,680,543 | 7/1987 | Kohen | 336/96 R |
| 4,683,402 | 7/1987 | Aubrey | 336/96 X |

Primary Examiner—Thomas J. Kozma
Attorney, Agent, or Firm—James B. Raden

[57] ABSTRACT

The invention provides an iduction generator comprising a plastic injection-molded housing having a port and one or more pole shoe(s) associated with a permanent magnet. A plastic bobbin inserted into the port and having a coil wound thereon which, through soldering eyelets, is connected to two contact tags in communication with an outwardly guided cable. A mounting member, with the port at the end thereof facing the soldering eyelets being closely sealed by a lid welded to the housing.

To provide an induction generator that is easy to manufacture and that insures a substantially improved operation, the port of the housing at the end thereof facing away from the soldering eyelets is closed by a bottom integrally formed with the housing and the pole shoe or shoes along with the associated permanent magnet are integrated in the housing.

11 Claims, 2 Drawing Sheets

INDUCTION GENERATOR

BACKGROUND OF THE INVENTION

The present invention relates to an induction generator comprising an injection-molded housing of plastic material provided with a port and further comprising one or more pole shoe(s), an associated permanent magnet and a plastic bobbin inserted into the port and having wound thereon a coil which is connected through soldering eyelets, to two contact tags in communication with an externally guided cable. It further comprises a mounting element, with the port, at the end facing the soldering eyelets being closely sealed by means of a lid welded to the housing. It also relates to a method of producing this induction generator.

An induction generator of the afore-described type is taught by DE-OS No. 34 00 870. According to the induction generator described therein, an orifice of a port extending through the housing is closely sealed by means of a flange formed on a cup-shaped coil-carrying bobbin and welded to the housing, with the pole shoes along with the permanent magnet being located in a recess of the coil-carrying bobbin.

The disadvantages involved with heretofore conventional induction generators relate to corrosion problems occurring in the pole shoe region caused by the ends of the pole shoes protruding from the housing. Such problems can be avoided by the use of high-quality materials for the manufacturer of the pole shoes. However, the use of such high-quality materials inevitably incurs substantial costs.

As metal particles or chips are likely to adhere to the protruding pole shoes in form-locking manner, a short-circuiting risk and a change in the output signal of the induction generator, respectively, cannot be excluded. A further disadvantage is that the joints require close tolerances to the pole shoe dimensions for proper operation. In addition, leak proofness of conventional induction generators, particularly in the pole shoe region, is considered critical. This is attributable to a plurality of seams and joints involving an enhanced risk of damage caused by changing temperature and impact stresses. Equally disadvantageous, is the need to provide for different generator configurations, different bobbins along with pole shoes and the associated permanent magnet, causing an increase in the manufacturing costs of conventional induction generators.

SUMMARY OF THE INVENTION

It is, therefore, an object of the present invention to provide an induction generator of the afore-described type which, in avoiding the afore-mentioned disadvantages, is easier to manufacture, and results in substantial improvement in operation.

The generators of this invention include a port in the housing, at the end facing away from the soldering eyelets. This port is sealed by a bottom integrally formed with the housing, with the pole shoe or shoes being integrated with the associated permanent magnet in the housing.

The construction of the induction generator as suggested by the invention enables the following advantages to be achieved:

(a) Unit construction alternative, with only one single assembly unit (housing) accommodating all the design variables for a variety of generator types;

(b) Less critical sealing joints; absolute leak proofness at the bottom side;

(c) Improved protection against external damage also in connection with abrupt changes in temperature;

(d) All dimensions of functional relevance are directly established in one run and in one assembly unit in correlation;

(e) A small number of components (bobbins) are employed which are identical for different types of units.

According to an advantageous embodiment of the subject matter of the invention, the ends of the pole shoes facing away from the soldering eyelets are integrated in the bottom, with the spacing of the pole shoe ends from the surface of the bottom amounting to at least 0.2 mm. As the pole shoes no longer protrude from the housing, operating safety is substantially improved and savings in material costs are achieved due to the fact that low-priced pole shoe materials can be used. Moreover, because of these measures, occurrence of corrosion problems on function-relevant parts is precluded.

To facilitate the manufacture of an induction generator comprising two pole shoes and one permanent magnet disposed therebetween, the bottom is provided with at least two supporting walls between which are disposed the pole shoes along with the permanent magnet.

Another simplification of the induction generator provided according to the invention resides in that, for connecting the cable to the coil, two contact tags of identical configuration are provided which, during final assembly, are bent toward the soldering eyelets. This measure permits simple shaping and enables a universally useful bobbin to be employed.

The costs involved with the manufacture of the bobbin can be substantially reduced in that the soldering eyelets can be of a semi-circular configuration and comprise tubular lugs forced into the corresponding recesses in the bobbin.

A smaller-sized configuration of the induction generator and a simplified housing injection mold are achieved in that the mounting element forming a mounting surface of the induction generator is partially coated by injection molding of the housing plastics.

Finally, an additional positioning lock of the mounted bobbin or sealing of the soldering eyelets and contact tags, respectively, is achieved by employing a damping or sealing compound, preferably a silicone-containing composition between the front side of the bobbin carrying the soldering eyelets and the lid.

A method for the manufacture of the induction generator according to the invention is also described herein.

BRIEF DESCRIPTION OF THE DRAWING

The invention will now be described in greater detail with reference to the drawing, with like components being identified with identical reference numerals.

In the drawings.

DETAILED DESCRIPTION OF A PREFERRED EMBODIMENT

Figure 1:
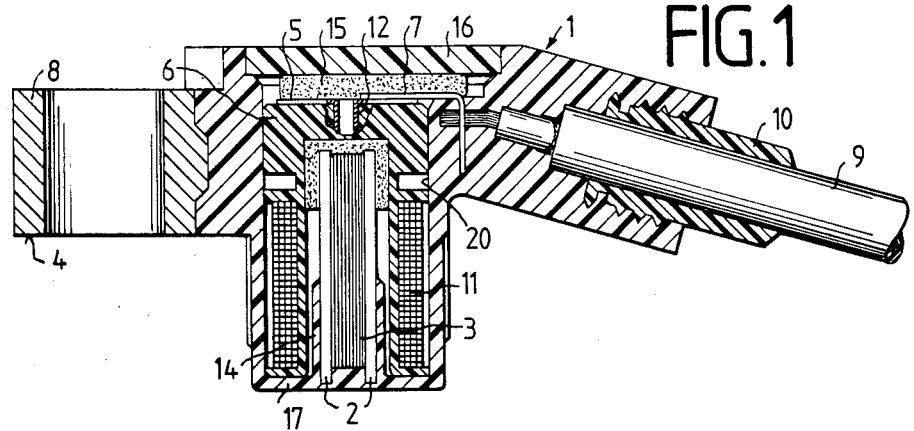
FIG. 1 is a cross-sectional view of a first embodiment of an induction generator according to the invention taken along the line X—X of FIG. 3.
Figure 2:
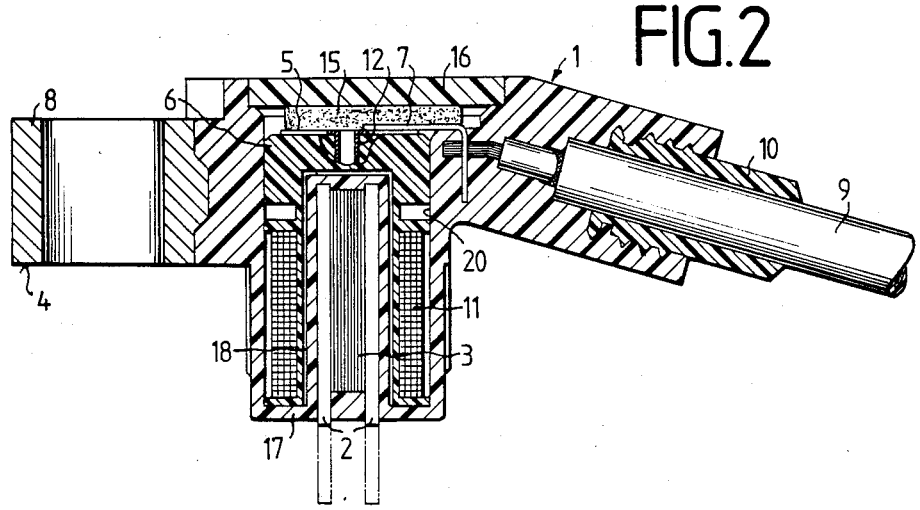
FIG. 2 is a cross-sectional view of a second embodiment of the invention viewed along the same line.
Figure 3:
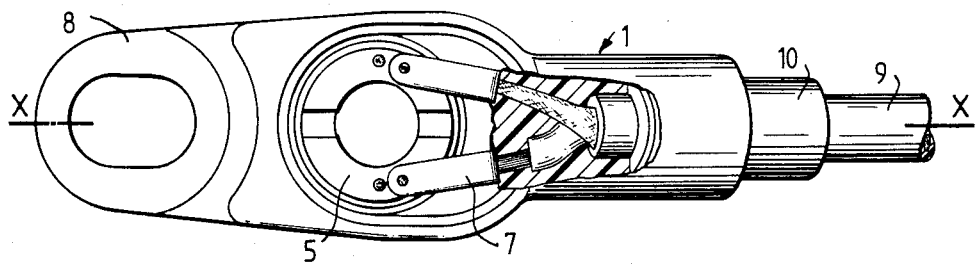
FIG. 3 is a plan view of an induction generator of this invention, partly in section, with no lid.
Figure 4:
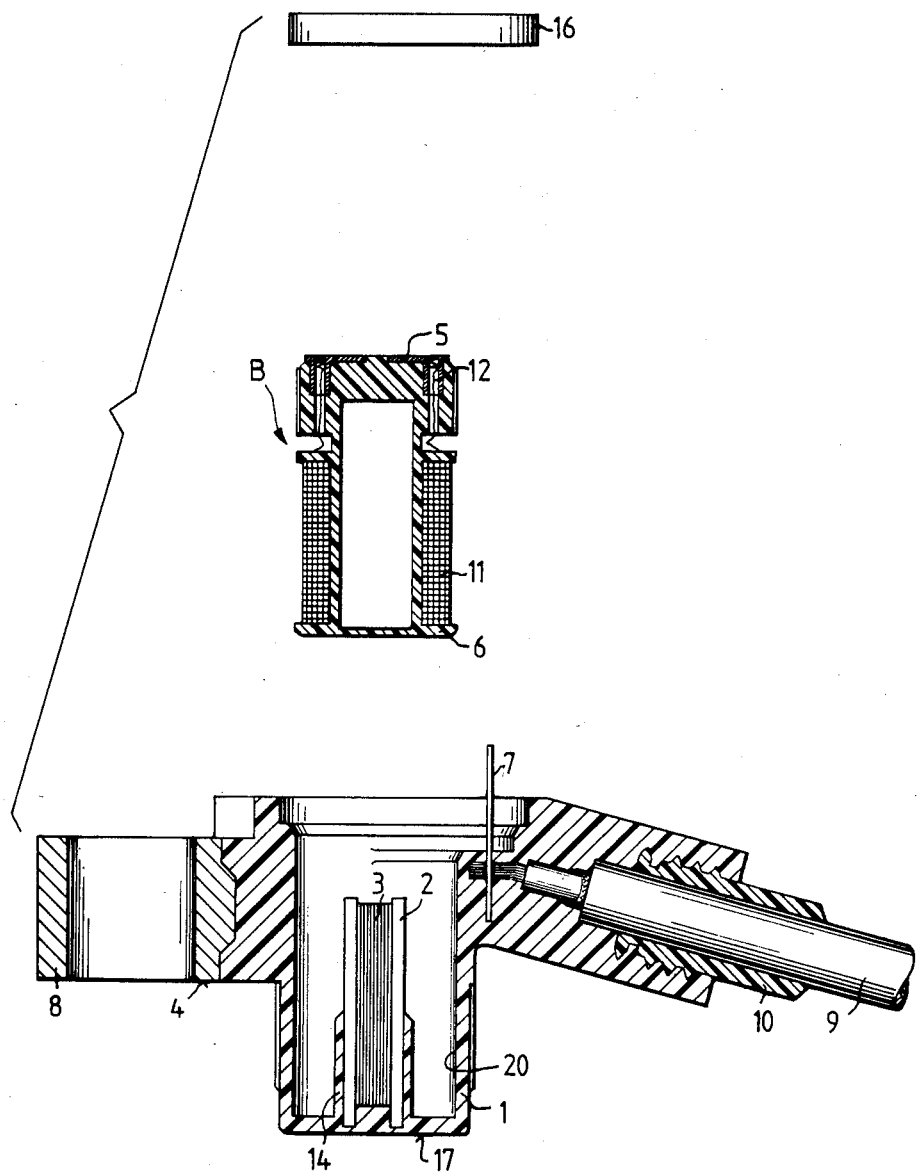
FIG. 4 is an exploded view of the individual components of the induction generator according to FIG. 1.

An induction generator as illustrated in FIGS. 1, 2 and 3 comprises a housing 1 injection-molded from a suitable plastic material and provided with a continuous port 20 closely sealed by a bottom 17 integrally formed with housing 1. On the right-hand side as viewed in the drawing, the housing 1 is provided with a plastic-coated cable 9 extending through a nozzle 10. Plastic is applied to the housing by injection molding. The cable, preferably, is of a two-core or of a one-core shielded configuration. The insulated ends of the cable 9 are connected (for example, by welding) to two contact tags 7 of identical shape which are cast in plastic.

Also surrounded by housing plastic are two pole shoes 2 symmetrically arranged about the longitudinal axis of port 20, with a permanent magnet 3 located between the two pole shoes and the bottom-sided ends integrated in the bottom 17. To impart to the "magnet-with-pole-shoes" package of the invention a higher stability in shape, provision is made for a cylindrical supporting wall 14 integrally formed with the bottom 17 and being in abutment with the external surface of the two pole shoes 2.

On the left-hand side as viewed in the drawing, the housing 1 is provided with a mounting element 8 which in part is coated by injection molding with plastic. The lower surface of such mounting member 8 forms a mounting surface 4 of the induction generator, the axial spacing of which from the plane of the pole shoe ends constitutes an important measurement of function.

The port 20, in addition to the two pole shoes 2 along with the permanent magnet 3, accommodates a bobbin 6 which is injection-molded from plastic. The diameter of the bobbin 6 approximately corresponds to that of the port 20 and which, with the central recess thereof, encloses the pole shoes 2 along with the permanent magnet 3. A coil 11 wound on the bobbin 6, with the ends thereof, in communication with two semi-circular soldering eyelets 5. The eyelest 5 are forced through tubular lugs 12, into corresponding recesses in the bobbin 6 and are welded to the correspondingly bent contact tags 7. Finally, the port 20, is closed from the top, by means of a lid 16, with the chamber formed between the top of the bobbin 6 carrying the soldering eyelets 5 and the lid 16, being capable of being filled with a damping or sealing compound 15.

A second embodiment of the induction generator of this invention is illustrated in FIG. 2. The generator is provided with two pole shoes 2 integrated in the housing 1 with the ends thereof protruding from housing 1. The supporting walls 14 of the embodiment as shown in FIG. 1, have been replaced in FIG. 2 by a section 18 closed at the top which is integrally formed with the bottom 17, as are the supporting walls 14. As illustrated in FIG. 2, the pole shoes 2 are cemented together with the permanent magnet 3 and, in the course of the manufacturing process, are held, at the extended ends, in the housing injection mold while being sprayed by plastic. Subsequently, the pole shoes 2 are cut to operating length.

The induction generator according to this invention is composed of two main assembly units, the first one being housing 1 closed at the bottom and completely injection-molded from plastic. All construction-related parts are accommodated therein in the form of mountable parts. The second assembly unit is formed by bobbin 6 which is identical in all embodiments and is universally employable along with coil 11 wound thereon. By use of the two soldering eyelets 5, assembly of both of the two afore-mentioned units and of the final induction generator is accomplished by a minimal number of manufacturing steps which will be described in greater detail as follows:

The plastic nozzle 10 required for sealing the induction generator if first injection-molded to the insulated end of the cable 9, and then the contact tags 7 (of identical configuration in both conductors or conductor and shield, respectively) are joined therewith by soldering. The so formed first component unit A along with the pole shoes 2, the permanent magnet 3 disposed therebetween, and the mounting element 8, are placed into the housing injection mold (not shown) so as to thereby adjust to a precise spacing of the pole shoes 2 from one another and from the mounting surface 4 of the induction generator, respectively.

By injection molding the housing 1 along with the afore-mentioned mountable components A, 2, 3 and 8 located therein, all critical measurements of function of the inductor generator are readily established relative to one another.

The bobbin 6 also made of plastic, is injection-molded in a bobbin injection mold (not shown) and, afterwards, coil 11 is wound thereon. The twisted ends of the coil 11 are introduced into the tubular lugs 12 of the soldering eyelets 5 which eyelets have been forced into the bobbin 6 beforehand, and joined therewith by soldering.

During final assembly, the complete bobbin 6 which forms a second component unit B is inserted into the port 20 of housing 1, with the lock against lateral twisting being adoptable by the support walls 14 holding the pole shoes 2, and by the closed recess 18 of bottom 17, respectively. The special shaping of the soldering eyelets 5 permits the use of the same bobbin 6 within a pole shoe location range of up to approximately 180° relative to the longitudinal X—X axis of the induction generator. Thereafter, the contact tags 7 are bent toward the soldering eyelets 5 and joined therewith by soldering. After an additional position lock of the bobbin 6 and a damping or sealing compound 15, preferably a silicone-containing composition, coating the soldered joints, has been applied, a plastic lid 16 is inserted and welded to housing 1.

What is claimed is:

1. An induction generator comprising:
   (a) an injection molded housing of plastic material provided with a port;
   (b) at least one pole shoe;
   (c) a permanent magnet associated with the at least one pole shoe;
   (d) a bobbin made of plastic material accommodated in the port, a coil wound on the bobbin and connected through soldering eyelets to two contact tags, the contact tags being in communication with an externally guided cable; and
   (e) a mounting element on said housing displaced from said port;
   (f) the end of the port facing the soldering eyelets being tightly closed by a lid welded to the housing, the end of the port facing away from the soldering eyelets being closed by a bottom integrally formed with the housing, and the pole shoe and the associated permanent magnet being integrated in and sealed within the housing with the housing bottom extending over said at least one pole shoe.

2. The induction generator according to claim 1 wherein the end of the pole shoe facing away from the soldering eyelets is integrated in the bottom.

3. The induction generator according to claim 2 wherein the spacing of the pole shoe ends from the surface of the bottom is at least about 0.2 mm.

4. The induction generator according to claim 1 wherein the bottom includes a recess accommodating the pole shoe along with the associated permanent magnet.

5. The induction generator according to claim 4 wherein the sealed end of the pole shoe is spaced from the surface of the bottom.

6. The induction generator according to claim 1 including two said pole shoes disposed in parallel with respect to one another, and said permanent magnet located therebetween and wherein the bottom comprises at least two support walls between which the pole shoes along with the permanent magnet are disposed.

7. The induction generator according to claim 2 wherein said two contact tags are two identically shaped contact tags are provided for connecting the cable to the coil.

8. The induction generator according to claim 2 wherein the mounting element forming a mounting face of the induction generator is provided, in part, with an injection-molded coating of plastic forming the housing.

9. The induction generator according to claim 2 wherein a damping or sealing compound is provided between the front side of the bobbin carrying the soldering eyelets and the lid.

10. The induction generator, according to claim 9 wherein the damping or sealing compound contains a silicone composition.

11. The induction generator according to claim 2 wherein the soldering eyelets are of a semi-circular configuration and comprise tubular lugs forced into corresponding recesses in the bobbin.

* * * * *